A. J. Smith.
Grain Binder.
N° 61272. Patented Jan. 15, 1867.
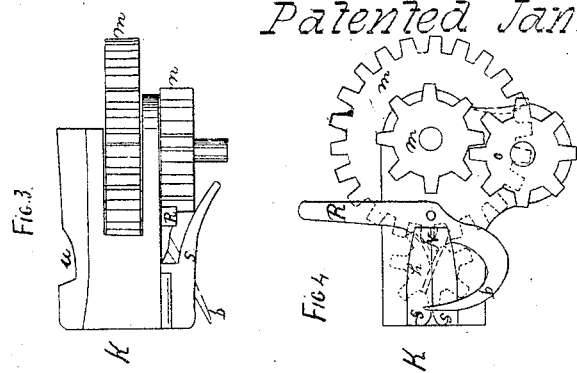
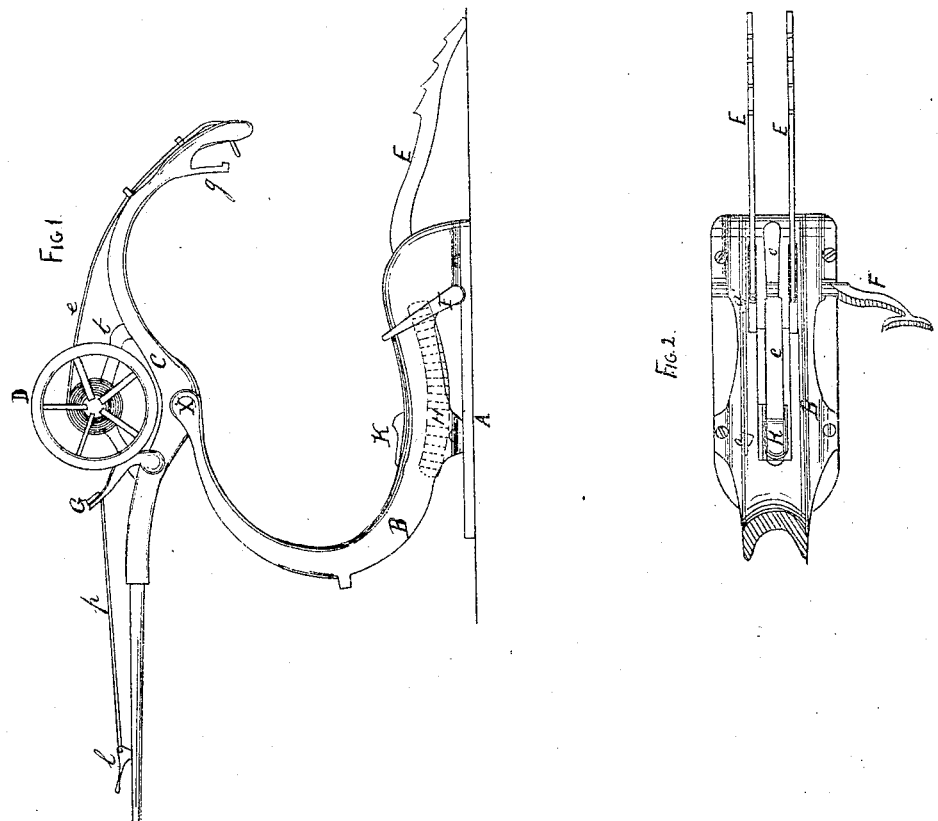
Witnesses.
John P. Jacobs
Charles Alexander
Inventor.
Andrew J. Smith
per Attorney
Alexander & Mason

UNITED STATES PATENT OFFICE.

ANDREW J. SMITH, OF NEW YORK, N. Y.

IMPROVEMENT IN GRAIN-BINDERS.

Specification forming part of Letters Patent No. 61,272, dated January 15, 1867.

*To all whom it may concern:*

Be it known that I, ANDREW J. SMITH, of New York, State of New York, have invented certain new and useful Improvements in Grain-Binders; and do hereby declare that the following is a full, clear, and exact description of the same, reference being had to the accompanying drawings and the letters of reference marked thereon.

Figure 1 represents a side elevation of this grain-binder. Fig. 2 represents a longitudinal section of the same. Fig. 3 is a side view of the sliding-gear block. Fig. 4 is an inverted view of said block.

In the drawings hereto annexed, and forming a part of this specification, B represents the frame of the grain-binder, which rests upon a platform, A, and is crooked in the form shown in Fig. 1. This frame is of metal or substantial timber, and hollow on its under side, being provided with ears, as shown, by which means it is attached to said platform A. This frame B has an oblong slot, C, which extends near the whole length of its upper side, where the same is horizontal. Upon one of the inner sides of the horizontal portion of this frame is a segment, H, which is provided with cogs and is firmly attached to the frame. The object of this section will be hereinafter set forth. Resting upon the platform A, and near the forward part of the frame B, is a foot-lever, F. This lever is provided with a rod, which extends from side to side of the frame. Attached to this lever are a series of notched forks, E E, (see Fig. 2,) which extend from slots made in frame B, forward of the same, and form an apron. These forks are thrown in an upright position by forcing the lever down toward the rear of the frame B. C represents the wire-carrier. This wire-carrier is crooked in the form shown, Fig. 1, and is pivoted to the extreme point $x$ of the curved portion of frame B, at about the center of said carrier, and rests ordinarily in a longitudinal position. Directly over the pivot X and upon the wire-carrier C, is a reel, D, which is secured upon the carrier by a support, $t$. This reel is made in any of the ordinary forms, and is provided with wire $e$, which passes from said reel forward upon the upper side and to the end of the wire-carrier, there being suitable eyes on the carrier to keep the wire in the right position. G represents a brake, which is secured upon the wire-carrier, directly in the rear of the reel. Running from said brake to the portion of the carrier which forms handle is a wire, $p$, which is secured to a small catch, $l$, and regulates the velocity of the reel when the same is in operation. $g$ is a spring, which is formed at the forward end of the wire-carrier, and is placed a slight distance beneath the end of said carrier, where the wire $e$ passes through, the spring and end of carrier forming a jaw, as shown, Fig. 1.

K represents the sliding gear-block. This block sets within the oblong slot $c$ in frame B, and readily slides therein. This gear-block is provided with a large cog-wheel, $m$, set between two portions of this block, at the rear end, and a small cog-wheel near the forward end, and between the two portions of said block. This cog-wheel is shown in dotted lines at $h$, in Fig. 4. The wheel $m$ meshes into the wheel $h$. The under portion of the gear-block is made somewhat in a triangular shape and has two small wheels, $n$ and $o$, which mesh into each other and are placed upon the under side of the rear portion of the gear-block. Wheels $m$ and $n$ are pinioned together and turn at the same time. R is a crooked knife, which is pivoted to the under side of block K, forward of the wheels $n$ and $o$, and has a handle which extends outside of the block, as shown. This knife is for the purpose of securing the wire by its crook $f$ and cutting the same by its convex blade $z$, in dotted lines. $s$ $s$ are two small arms, fastened at the forward end of under portion of block K, and directly beneath the wheel $h$, acting for the purposes of receiving and securing the wire, as will be hereinafter set forth.

At the forward edge of the gear-block K there is a V-shaped notch, while in the wheel $h$ there is a slot which is made in the same and through the shaft, by which it revolves. This wheel $h$ is placed so that the wire is placed in the V-shaped notch and into the slot in said wheel at one time. In operating this grain-binder the same is bolted onto a platform on the reaper, at the back end, in such a manner that the grain may be brought to it with ease and a small boy may operate it. The wire is suspended from the eye in the end of wire-carrier C to the gear-block K. The grain is raked upon the apron E, when some person presses upon the foot-lever F, throwing the grain up and against the suspended wire, when the boy at the rear or handle portion of wire-carrier throws the same upward, when the end of the wire-carrier falls down, pressing the grain hard against the wire, which is now around three sides of the bundle. The jaw formed at the end of the wire-carrier clasps the end of the gear-block K, by means of a notch, as seen at $n$, Fig. 3, the two ends of the wire being in the V-shaped notch at the end of gear-block and in the slot in the wheel $h$. The gear-block is forced to the rear of the binder by the jaw and the cogs of the wheel $o$ meshing into the cogs of the segments H as the block is forced backward, turning the wheels $m$, $n$, and $h$, and twisting the wire as it travels along. Just before the sliding-gear block has reached the end of the slot $c$ in frame B, the projecting end of the knife R strikes a small lug, $a$, on the under side of said frame, cutting the wire $e$ in the center of the twist and letting the bundle drop out.

The wire is left suspended from the wire-carrier to the gear-block, the boy presses the end of carrier down, and the foot-lever is again thrown up, leaving the binder ready for another bundle. As the gear-block is slid forward again there is another lug, $a'$, which hits the end of the knife and puts it in proper position for the next bundle.

Having thus fully described my invention, what I claim as new, and desire to secure by Letters Patent, is—

1. The lever F, provided with the notched forks E, when arranged and used as and for the purposes herein set forth.

2. The sliding gear-block K, constructed, arranged, and operating substantially as and for the purposes herein specified.

As evidence that I claim the foregoing, I have hereunto set my hand in the presence of two witnesses.

ANDREW J. SMITH.

Witnesses:
T. HIXSON,
WILLIAM BOYD.